(12) United States Patent
Streeton et al.

(10) Patent No.: US 6,808,588 B1
(45) Date of Patent: Oct. 26, 2004

(54) CONTINUOUS MAT MAKING PROCESS AND PRODUCT

(75) Inventors: Amy B. Streeton, LaGrange, GA (US); William O. Burke, III, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 271 days.

(21) Appl. No.: 10/015,205

(22) Filed: Dec. 4, 2001

(51) Int. Cl.$^7$ .................................................. C09J 5/00
(52) U.S. Cl. .......................... 156/324; 156/72; 15/217; 428/96
(58) Field of Search .......................... 156/72, 245, 253, 156/324; 264/257, 258; 15/216, 217, 215; 428/95, 96, 97, 85

(56) References Cited

U.S. PATENT DOCUMENTS

| | | | |
|---|---|---|---|
| 4,332,847 A | | 6/1982 | Rowland ..................... 428/156 |
| 4,653,366 A | * | 3/1987 | Nichols et al. ............... 83/114 |
| 4,741,065 A | | 5/1988 | Parkins ........................ 15/217 |
| 4,902,465 A | * | 2/1990 | Kerr et al. ................... 264/257 |
| 4,902,554 A | | 2/1990 | Lang ........................... 428/195 |
| 5,170,526 A | | 12/1992 | Murray ......................... 15/215 |
| 5,227,214 A | | 7/1993 | Kerr et al. .................... 428/95 |
| 5,834,086 A | * | 11/1998 | Burke et al. .................. 428/95 |
| 5,902,662 A | * | 5/1999 | Kerr ............................. 428/95 |
| 5,968,631 A | | 10/1999 | Kerr ............................. 428/87 |
| 6,303,068 B1 | | 10/2001 | Kerr et al. ................... 264/293 |
| 6,428,873 B1 | | 8/2002 | Kerr ............................. 428/95 |

FOREIGN PATENT DOCUMENTS

| | | | | |
|---|---|---|---|---|
| JP | 57053338 A | * | 3/1982 | ............ B29H/5/00 |
| JP | 07060758 A | * | 3/1995 | ............ B29C/35/02 |

OTHER PUBLICATIONS

English abstract of JP 07060758.*
English abstract of JP 57053338.*

* cited by examiner

Primary Examiner—Jeff H. Aftergut
Assistant Examiner—John L. Goff
(74) Attorney, Agent, or Firm—Terry T. Moyer; Charlotte C. Wilson

(57) ABSTRACT

The present disclosure relates to a continuous process for making floor mats having a textile upper surface and a rubber or rubber-like backing. In the one embodiment of the present process, a continuous roll of unvulcanized rubber is joined to a continuous roll of textile material during vulcanization. In an alternate embodiment, textile panels are positioned onto a continuous roll of unvulcanized rubber, later being joined during vulcanization. After vulcanization of either a textile roll or textile panels to a rubber backing, the resultant mat composite is cut into individual mat units.

14 Claims, 3 Drawing Sheets

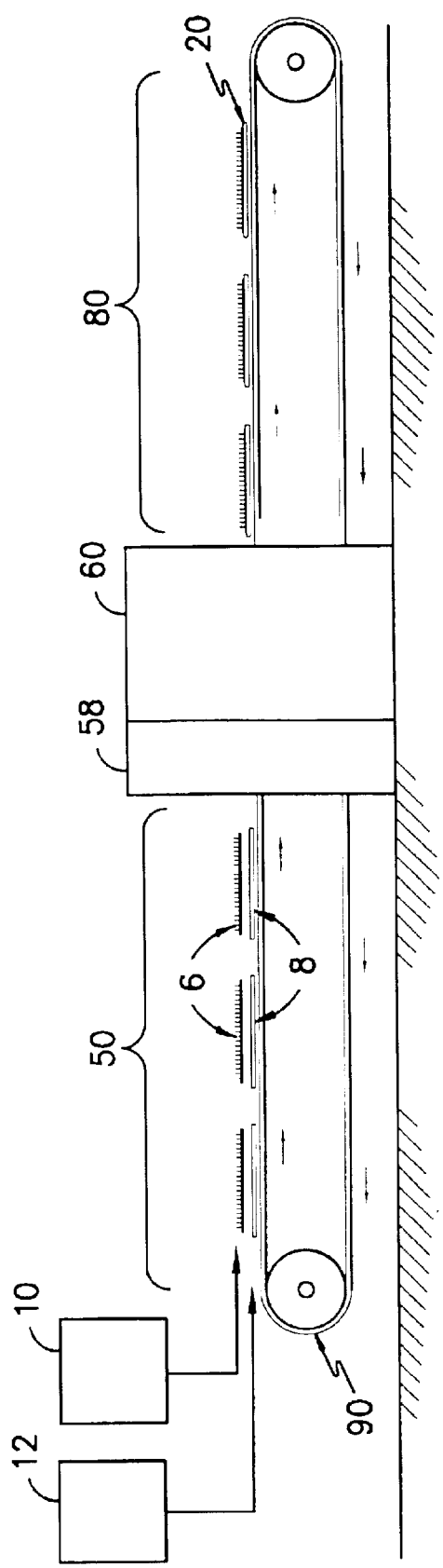
FIG. -1A-
PRIOR ART
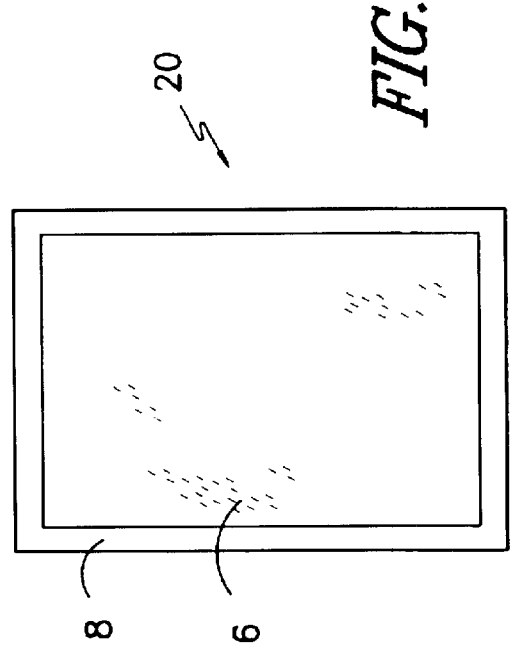
FIG. -1B-

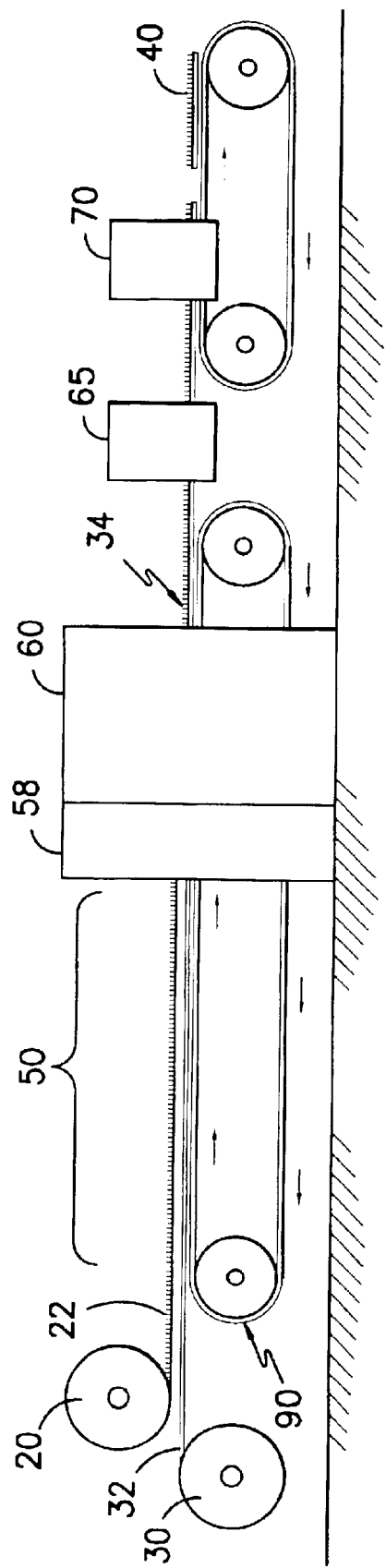
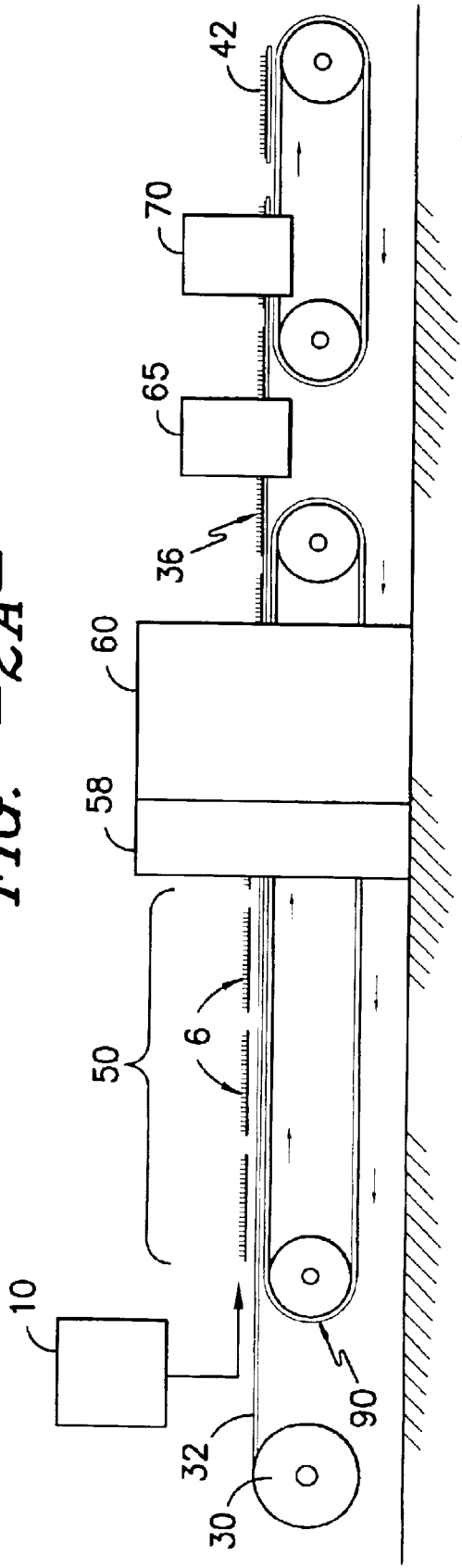
FIG. -2A-
FIG. -2B-

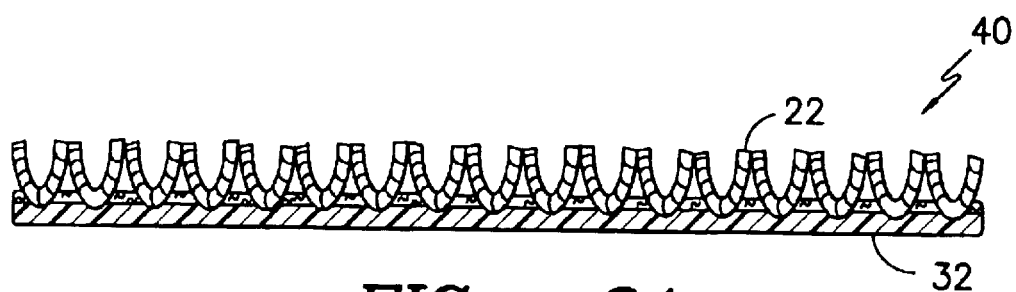
FIG. -3A-
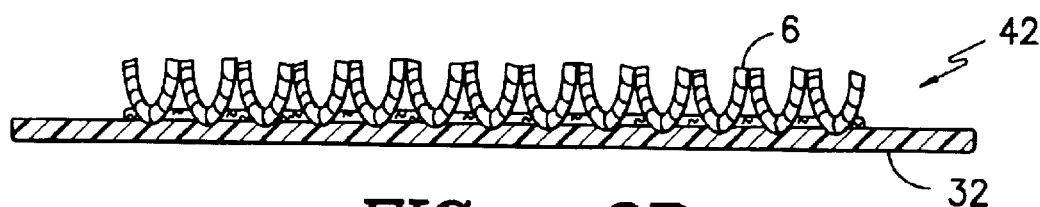
FIG. -3B-
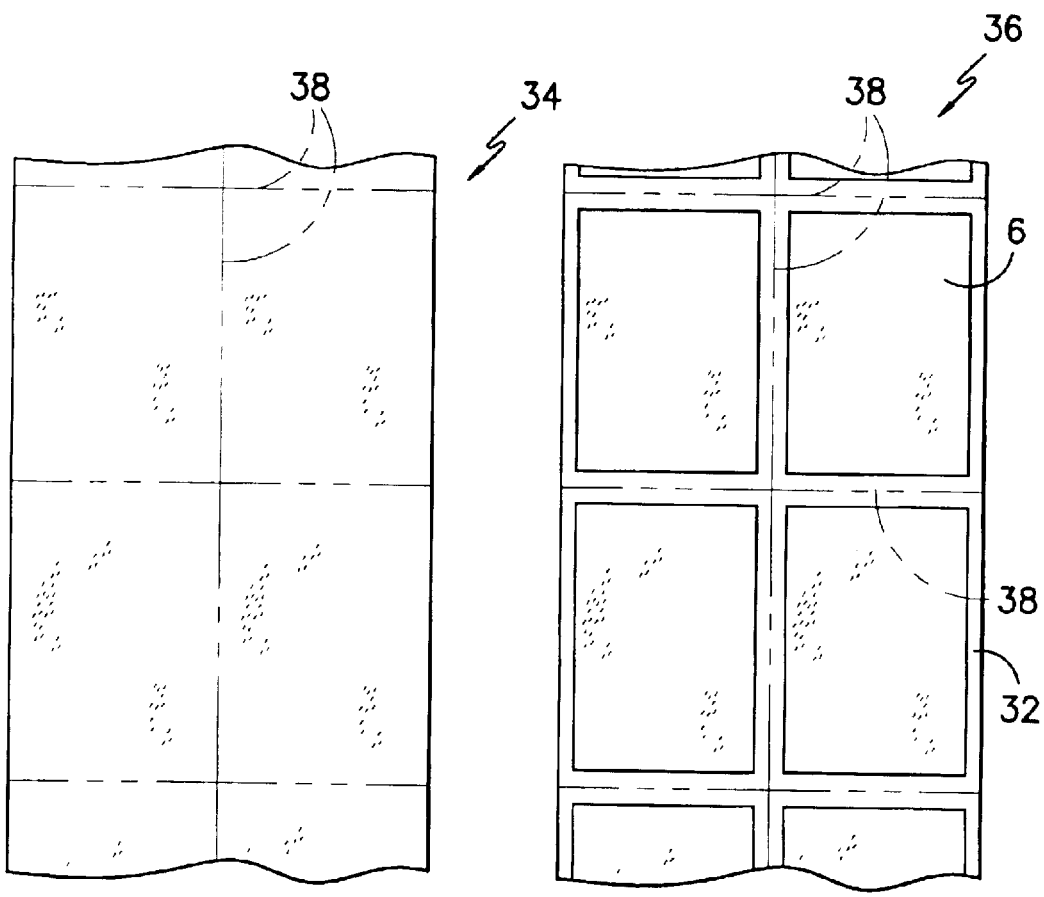
FIG. -4A-    FIG. -4B-

CONTINUOUS MAT MAKING PROCESS AND PRODUCT

TECHNICAL FIELD

The present disclosure relates to a continuous process for making floor mats having a textile upper surface and a rubber or rubber-like backing. In the one embodiment of the present process, a continuous roll of unvulcanized rubber is joined to a continuous roll of textile material during vulcanization. In an alternate embodiment, textile panels are positioned onto a continuous roll of unvulcanized rubber, later being joined during vulcanization. After vulcanization of either a textile roll or textile panels to a rubber backing, the resultant mat composite is cut into individual mat units.

BACKGROUND

Dust control mats, which have a textile side and a rubber or rubber-like backing, are generally used in access ways where people tend to brush or scrape their feet to prevent carrying moisture and/or dirt into other areas of the premises. Normally, these mats are located in areas of high pedestrian traffic such as doorways. In many cases, these mats are part of an industrial laundry inventory, being rented to customers and serviced by the laundry. On some frequency (e.g., weekly), the laundry collects soiled mats, launders them, and then returns them to the customer. It is important, therefore, that these mats be capable of withstanding rigorous and routine laundering.

In the past, manufacture of these textile-rubber mats has been a time-consuming, labor-driven process. Both the textile material and the unvulcanized rubber sheeting must be cut to the desired dimensions. The textile panel is positioned over the rubber panel on a conveyor belt, and the stacked pair is carried into a vulcanizing chamber. After vulcanization, the individual mat units are created. In some instances, the mats must be trimmed to remove rubber that has spread unevenly during vulcanization.

The present process provides for the feeding of continuous rolls of textile material and unvulcanized rubber into the vulcanization chamber. Once vulcanized, the mat composite is carried through a cutting station where individual mat units are created. Such a process provides greater mat making efficiency.

BRIEF DESCRIPTION OF THE DRAWINGS

FIG. 1A is a schematic representation of the prior art process for producing a textile-faced rubber mat;

FIG. 1B is a plan view of the textile-faced rubber mat, as may be produced by the process of FIG. 1A;

FIG. 2A is a schematic representation of the present process for producing a textile-faced rubber mat, including a continuous roll of textile material and a continuous roll of unvulcanized rubber;

FIG. 2B is a schematic representation of an alternate embodiment of the present process for producing a textile-rubber mat, including a plurality of textile panels and a continuous roll of unvulcanized rubber;

FIG. 3A is a cross-section of a textile-faced rubber mat, as produced by the process of FIG. 2A;

FIG. 3B is a cross-section of a textile-faced rubber mat, as produced by the process of FIG. 2B;

FIG. 4A is a plan view of a layout of mats in accordance with the process of FIG. 2A; and FIG. 4B is a plan view of a layout of mats in accordance with the process of FIG. 2B.

DETAILED DESCRIPTION

FIG. 1A describes the prior art process for making a dust control mat having a textile upper surface and a rubber or rubber-like backing. In FIG. 1A, a textile substrate is cut into panels 6 at fabric cutting station 10. As shown, textile panels 6 comprise a tufted substrate. Unvulcanized rubber is cut into panels 8 at rubber cutting station 12. Textile panel 6 is positioned over rubber panel 8 in a staging area 50 along conveyor 90. Generally, textile panel 6 is centered on rubber panel 8, thereby creating a uniform border around the perimeter of mat 20.

The stacked panels 6, 8 are conveyed into a vulcanization chamber 60 where rubber panel 8 is softened and subsequently hardened to secure rubber panel 8 to textile panel 6. The first twelve to fifteen inches of vulcanization chamber 60 will be described herein as entry area 58. Entry area 58 is not subject to the pressures realized in vulcanization chamber 60, because of the shape of the diaphragm of the vulcanization press.

It was believed, heretofore, that entry area 58 needed to be a pre-heat area, designed to raise the temperature of textile panel 6 for improved cycle time. Therefore, as shown in FIG. 1A, entry area 58 is subject to temperatures near those of vulcanization conditions. The problem often encountered with such an approach, however, is that rubber panel 8 tends to pre-cure whenever processing delays cause rubber panel 8 to remain in entry area 58 for an extended time. This pre-curing prevents adequate adhesion between textile panel 6 and rubber panel 8, resulting in a flawed mat product.

Turning now to FIG. 2A, a continuous roll 20 of textile material 22 and a continuous roll 30 of unvulcanized rubber 32 are fed onto staging area 50 of conveyor 90. In one embodiment, conveyor 90 is perforated to act as a molding apparatus, in addition to being a carrier for mat components. During vulcanization, rubber layer 32 softens and moves into the perforations in conveyor 90, thereby creating cleats in the bottom of rubber layer 32. This process is described in U.S. Pat. No. 6,303,068 to Kerr et al., which is incorporated herein by reference. In a preferred embodiment, textile substrate 22 has approximately the same width as that of rubber 32. In an alternate embodiment, rubber 32 is wider than tufted substrate 22.

In FIG. 2B, an alternate process is shown, using a continuous roll 30 of unvulcanized rubber 32 with pre-cut textile panels 6. The process represented by FIG. 2B results in a mat 42 having a rubber border around its perimeter (similar to that of FIG. 1B). However, because of the continuous roll 30 of rubber 32, greater production efficiency is achieved.

Textile material 22 and textile panels 6 are shown as tufted substrates, although other textile constructions may be utilized, including woven, non-woven, and knitted constructions. Textile material 22 and textile panels 6 may be comprised of nylon, polyester, polypropylene, cotton, and other natural and synthetic fibers as may be known in the art. A preferred fiber is nylon. Textile material 22 and textile panels 6 may be printed before or after incorporation into mat 40 or mat 42, respectively. Further, textile material 22 and textile panels 6 may be comprised of solution-dyed yarns.

Rubber layer 32, as used in the process of FIGS. 2A and 2B, is comprised of acrylonitrile-butadiene rubber (NBR), styrene-butadiene rubber (SBR), carboxylated NBR, carboxylated SBR, ethylene-propylene-diene monomer rubber (EPDM), and blends thereof, all merely as examples. A preferred rubber composition is NBR rubber, sold under the name EXP-00861 by Associated Rubber Company of Tallapoosa, Ga. Preferred thicknesses of rubber layer 32 are in the range of about 15 mils to about 200 mils, with a more preferred thickness of about 60 mils. It should be understood that rubber layer 32 may further comprise multiple layers of various or similar rubbers, including foam rubber layers if desired. Vulcanization temperatures and cycle time may require adjustment accordingly depending on the number and type of layers used.

Turning again to FIGS. 2A and 2B, entry area 58 has a temperature considerably less than that of vulcanization chamber 60. Cooling water is circulated around entry area 58, causing the temperature in entry area 58 to be in the range of about 90° F. to about 110° F. By establishing entry area 58 as a "cool zone," the mat components are not subjected to the temperature and pressure differentials that may result in pre-curing of rubber 32. Rather, after mat components 22, 32 move through entry area 58, components 22, 32 are subjected to uniform pressure and temperature in vulcanization chamber 60. The first twelve inches of entry area 58 are not subject to uniform pressure and are maintained at a temperature of about 90° F. to about 110° F. The next three inches (inches 12 to 15) of entry area 58 experience a temperature gradient from low temperatures of about 90° F. to about 110° F. to high temperatures of about 360° F. to about 400° F.

During vulcanization, rubber layer 32 softens; pressure is applied to layers 22, 32, thereby pressing textile layer 22 into rubber layer 32; and then rubber layer 32 hardens, securing layers 22, 32 together. Similarly, textile panels 6 are also pressed into rubber layer 32 and are secured. Vulcanization typically occurs at a temperature in the range of about 280° F. to about 440° F., with a preferred temperature of about 360° F. The pressures used in vulcanization are typically in the range of about 15 p.s.i. to about 50 p.s.i., with a preferred pressure of about 40 p.s.i. With the temperatures and pressures described herein, cycle time for vulcanization is typically between about 2 minutes and about 20 minutes, with a cycle time of 4 minutes being expected under preferred vulcanization conditions.

Having undergone vulcanization, textile substrate 22 and rubber layer 32 comprise a mat composite 34. Mat composite 34 is then conveyed through a backing perforation station 65 into a cutting station 70, in which composite 34 is cut into individual mats 40. In FIG. 2B, textile panels 6 are adhered to rubber layer 32 to create composite 36, which is also conveyed through cutting station 70 for the production of individual mat units 42. Backing perforation station 65 includes a spiked roll over which mat composite 34 or 36 is run. The spikes in the roll penetrate the backing of mat composite 34 or 36, creating micro-valves that aid in the removal of water from the finished mat during laundering. Backing perforation station 65 is described in U.S. Pat. No. 4,653,366 to Nichols et al., which is incorporated herein by reference.

A printed mat may be created in a number of ways. In one embodiment, the roll 20 of textile material 22 is printed before the mat assembly process. In an alternate embodiment, composite 34 is printed before entering cutting station 70. In yet another embodiment, mats 40 are printed after assembly is completed. Printing may be included as part of the continuous process of the present disclosure.

Because of the pressures of vulcanization, it is not abnormal for textile component (either 22 or 6) to appear crushed. This is particularly true when textile component 22 or 6 is comprised of a tufted substrate. Pile height may be restored by washing, brushing, or vacuuming finished mat 40 or 42.

FIG. 3A shows a cross-section of mat 40, in which textile layer 22 and rubber layer 32 have approximately the same width. Mat 40, therefore, is a borderless mat. In an alternate embodiment, mat 40 may have borders on one or two edges. These borders are created along edges where the dimensions of rubber layer 32 exceed that of textile substrate 22. Whether the mat 40 is bordered on one or two edges depends on the pattern used for cutting composite 34 into individual mats 40. Alternately, mat 40 may have a printed border around the perimeter thereof.

FIG. 3B shows a cross-section of mat 42, in which textile panel 6 is surrounded by rubber from rubber layer 32. Mat 42, therefore, may be a bordered mat. These borders may have various dimensions, as may be desired by the customer. In some cases, it may be desirable to remove the rubber borders entirely. In addition to, or in lieu of, the rubber border, mat 42 may also include a printed border around the perimeter thereof.

One cut pattern for mats 40 is shown in FIG. 4A. Mat composite 34 may be cut along cut lines 38 to produce individual mat units 40. Cut lines 38 may be made in a variety of positions, as may be desired for mats of varying sizes. Cutting is achieved by any means known in the art, including manual cutting, mechanical cutting (i.e., with a blade), laser cutting, water jet cutting, ultrasonic cutting, and the like. An electronic sensor, for example, may be used to detect the appropriate cutting positions and to guide the cutting means in making the necessary cuts.

FIG. 4B shows a layout of textile panels 6 on rubber layer 32 to create composite 36. Again, example cut lines 38 are indicated. As may be appreciated from the drawing, the resultant mats 42 from composite 36 will have a border comprised of rubber.

What is claimed is:

1. A process for making a dust control mat, said process comprising the steps of:
   (a) positioning a textile component over a continuous layer of unvulcanized rubber;
   (b) subjecting said textile component and said unvulcanized rubber layer to a series of temperature and pressure zones within a vulcanization chamber to create a mat composite, in which
      a first zone has a first temperature,
      a second zone has a non-uniform second temperature, and
      a third zone has a uniform third temperature,
      wherein the first temperature is less than that of the third temperature and the third temperature is that associated with vulcanization, and wherein the second temperature is between the temperature of the first zone and the temperature of the third zone; and
   (c) cutting said mat composite to produce individual dust control mats.

2. The process of claim 1 wherein said textile component comprises a continuous roll of textile material.

3. The process of claim 1 wherein said textile component is comprised of fibers selected from the group consisting of nylon, polyester, cotton, and polypropylene.

4. The process of claim 3 wherein said textile component is comprised of nylon.

5. The process of claim 1 wherein said rubber layer is comprised of a rubber selected from the group consisting of acrylonitrile-butadiene rubber (NBR), styrene-butadiene rubber (SBR), carboxylated NBR, carboxylated SBR, ethylene-propylene-diene monomer rubber (EPDM), and blends thereof.

6. The process of claim 1 wherein said rubber layer is comprised of acrylonitrile-butadiene rubber.

7. The process of claim 1 wherein said rubber layer is comprised of multiple layers of rubber.

8. The process of claim 7 wherein said rubber layer includes at least one layer of foam rubber.

9. The process of claim 1 wherein said rubber layer has a thickness in the range of about 15 mils to about 200 mils.

10. The process of claim 9 wherein said rubber layer has a thickness of about 60 mils.

11. The process of claim 1 wherein the first temperature is about 90° F.

12. The process of claim 1 wherein the third temperature is in the range of about 280° F. to about 400° F.

13. The process of claim 12 wherein the third temperature is about 360° F.

14. The process of claim 1 wherein, after vulcanization in step (b), said mat composite is carried over a roll having spikes attached thereto which perforate said rubber layer and create microvalves on the surface of said rubber layer.

* * * * *